United States Patent [19]
Suzuki et al.

[11] Patent Number: 5,940,314
[45] Date of Patent: Aug. 17, 1999

[54] ULTRA-HIGH DENSITY MEMORY DEVICE

[75] Inventors: Motofumi Suzuki, Aichi-ken; Takeshi Ohwaki; Yasunori Taga, both of Nagoya; Hiroshi Tadano, Nagoya; Testu Kachi, Nisshin; Yuichi Tanaka, Owariasahi; Kazuyoshi Tomita, Nagoya, all of Japan

[73] Assignee: Kabushiki Kaisha Toyota Chuo Kenkyusho, Aichi, Japan

[21] Appl. No.: 09/009,304

[22] Filed: Jan. 20, 1998

[30] Foreign Application Priority Data

Jan. 21, 1997 [JP] Japan .................................. 9-023257

[51] Int. Cl.⁶ .................................................. G11C 11/42
[52] U.S. Cl. .............................. 365/10; 365/121; 365/122
[58] Field of Search ..................... 365/121, 122, 365/151, 33, 10, 109, 145

[56] References Cited

U.S. PATENT DOCUMENTS

| | | | |
|---|---|---|---|
| 4,424,580 | 1/1984 | Becker et al. | 365/121 |
| 5,331,589 | 7/1994 | Gambino et al. | 365/151 |

FOREIGN PATENT DOCUMENTS

| | | |
|---|---|---|
| 40 30 404 A1 | 4/1992 | Germany . |
| 9-121066 | 5/1997 | Japan . |

OTHER PUBLICATIONS

Z. Gu, et al., "Molecular–Level Design of a Photoinduced Magnetic Spin Coupling System: Nickel Nitroprusside", The Journal of Physical Chemistry, Nov. 21, 1996, vol. 100, No. 47, pp. 18289–18291.

*Primary Examiner*—David Nelms
*Assistant Examiner*—David Lam
*Attorney, Agent, or Firm*—Oblon, Spivak, McClelland, Maier & Neustadt, P.C.

[57] ABSTRACT

A ultra-high density memory device utilizing a photoinductive ferromagnetic thin film. A photoinductive ferromagnetic thin film is formed on a GaAs substrate, and a tip is arranged so as to face the photoinductive ferromagnetic thin film. The GaAs substrate is disposed on an xyz scanner, and the three-dimensional positional relationship between the GaAs substrate and the tip is changed by the xyz scanner. Blue light is radiated onto the thin film in order to make the magnetization orientation of molecules uniform. Through application of a relatively high voltage, a relatively large current is caused to flow between the tip and the substrate, so that randomization of the magnetization orientation of molecules of the photoinductive ferromagnetic thin film; i.e., writing operation is carried out. Also, through uniform radiation of circular polarized light onto the GaAs substrate and application of a relatively low voltage, tunneling current is caused to flow between the tip and the substrate, which tunneling current changes in accordance with the magnetization orientation of molecules of the photoinductive ferromagnetic thin film. Through detection of the tunneling current, the magnetization orientation of molecules of the photoinductive ferromagnetic thin film can be detected.

15 Claims, 6 Drawing Sheets

F I G. 3
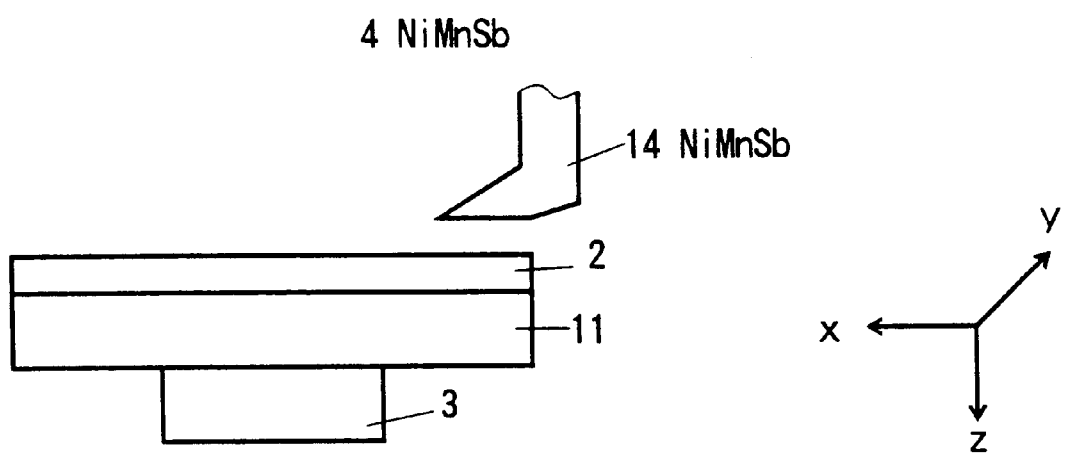

ULTRA-HIGH DENSITY MEMORY DEVICE

BACKGROUND OF THE INVENTION

1. Field of the Invention

The present invention relates to an ultra-high density memory device that utilizes, for information recording, magnetic moment of molecules of photoinductive ferromagnetic thin film.

2. Description of the Related Art

Recently, there have been discovered photoinductive ferromagnetic molecules whose magnetization orientation align ferromagnetically when irradiated with blue light and become random when exposed to heat. Also, it has been suggested that use of such molecules enables magnetic recording at a molecular level.

However, when a memory device is constituted through use of such photoinductive ferromagnetic molecules, there arises a difficulty as to how to write and read information at a molecular level. No specific structure therefor has been known.

SUMMARY OF THE INVENTION

The inventors of the present invention have conceived that if a photoinductive ferromagnetic thin film is disposed between a substrate and a scanning tip similar to that used in a scanning tunnel microscope (STM) and a spin-dependent tunneling effect between the substrate and the scanning tip is utilized, reading and writing of magnetic information at a molecular level would be enabled.

The present invention was accomplished based on the foregoing concept, and an object of the invention is to realize an ultra-high density memory device that utilizes a photoinductive ferromagnetic thin film.

In order to achieve the above object, a memory device according to the present invention includes a substrate, a photoinductive ferromagnetic thin film formed on the substrate, and a tip opposed to the photoinductive ferromagnetic thin film, the relative positional relationship between the tip and the photoinductive ferromagnetic thin film being changeable, and at least one of the substrate and the tip is formed of a material in which spin-polarized electrons can exist, so that the magnetization orientation of molecules of the photoinductive ferromagnetic thin film is detected as recorded information, based on tunneling current or field emission current of spin-polarized electrons that flow between the tip and the substrate.

In the above-described memory device, a mechanism similar to the scanning mechanism of an STM can be used for changing the relative position between the tip and the photoinductive ferromagnetic thin film. For example, a piezoelectric xyz scanner can be used.

Uniform radiation of blue light onto the photoinductive ferromagnetic thin film enables the magnetization orientation of molecules to be uniformly ordered, thereby erasing recorded information. When blue light is radiated onto the photoinductive ferromagnetic thin film in a state in which an external magnetic field is applied thereto, the magnetization orientation of the molecules can be ordered to the direction of the magnetic field. When molecules of the photoinductive ferromagnetic thin film are heated by a current flowing between the tip and the substrate, the magnetization orientation of the molecule is disordered, effectively writing information at that location.

Photoinductive ferromagnetism is a phenomenon that occurs due to energy of electrons excited by blue light. This electron excitation can be induced similarly through radiation of an electron beam having an energy level similar to that of blue light. That is, information can be written into the photoinductive ferromagnetic thin film through a manner in which an electron that has been spin-polarized in a predetermined direction is radiated from the tip or the substrate onto the photoinductive ferromagnetic thin film at an energy level of about 3 eV in order to change the magnetization orientation of molecules to a desired direction. In such a way data of "0" or "1" can be written in accordance with the orientation of the spin-polarized electron.

In the case where a circular area having a diameter corresponding to that of a light beam is considered a unit memory area, information stored in a plurality of unit memory areas can be erased when the photoinductive ferromagnetic thin film is uniformly heated to disorder the magnetization orientation of molecules. Data can be written by radiating the light beam in an unit memory area and ordering the magnetization orientation of molecules in a certain direction in the area. Further, in the case where the diameter of a light beam is made equal to that of a current path and a circular area having the diameter is considered a unit memory area, "1" or "0" can be stored by radiating the light beam to uniformly order the magnetization orientation of molecules, and "0" or "1" can be stored by flowing a current to disorder the magnetization orientation of the molecules.

Moreover, in the case where a circular area having a diameter corresponding to that of a light beam serves as a unit memory area, "0" or "1" can be stored therein by controlling the magnetization orientation of molecules in the unit memory area between a predetermined first direction and a second direction opposite the first direction. The magnetization orientation of the molecules can be changed to the first direction when the light beam is radiated to the unit memory area in a state in which a magnetic field is applied in the first direction. Also, the magnetization orientation of the molecules can be changed to the second direction when the light beam is radiated to the unit memory area in a state in which the magnetic field is applied in the second direction.

Examples of materials for the photoinductive ferromagnetic thin film include transition metal cyanides; more specifically, cobalt-iron cyanide ($K_{0.2}Co_{1.4}[Fe(CN)_6] \cdot 6.9H_2O$) and nickel-iron cyanide.

At least one of the substrate and the tip is formed of a material in which spin-polarized electrons can exist. That is, there can be used a substance in which circular polarized light excites into a conduction band spin-polarized electrons which have a spin oriented to a direction corresponding to the rotational direction of the polarized light. An example of such a substance is a semiconductor, such as GaAs, that has a large spin-orbit interaction and a relatively narrow forbidden band. Alternatively, the substrate may be formed of a nonmagnetic metal, and the tip may be formed of a ferromagnetic material or a ferromagnetic metalloid whose spin-polarization coefficient is 1. In this case, spin-polarized electrons are generated within or injected into the tip, and information recorded in the photoinductive ferromagnetic thin film is read out in accordance with tunneling current or field emission current that flows between the substrate and the tip. Further, if a magnetic field of the substrate does not affect the magnetic moment of the molecules of the photoinductive ferromagnetic thin film, the tip may be formed of a nonmagnetic metal and the substrate may be formed of a ferromagnetic material or a ferromagnetic metalloid. Moreover, both the tip and the substrate may be formed of a ferromagnetic material or a ferromagnetic metalloid. That is, the requirement is that at least one of the substrate and the tip is formed of a material in which spins uniformly ordered can be created through light excitation, magnetic field excitation, current injection, or the like; i.e., a material in which spin-polarized electrons can exist.

In addition to Fe-1.7% Ru alloy, Fe-2.0% C alloy, and like alloys, examples of the ferromagnetic material used in the present invention include ferromagnetic materials which contain two or more elements selected from Fe, Ni, and Co, which contains Co elements in an amount of 40% or less, and whose coercive forces are weak, and magnetic materials, such as Co, Co-Sm, Co-Cr-Fe, Co-Pt, Co-Pt, Co-Pt-Ni, and Co-Pt-V, which contain Co elements in an amount of 20% or more and whose coercive forces are strong. Also, an iron alloy having a spin-polarization coefficient of about 0.2–0.5 can be used as the ferromagnetic material.

Examples of the ferromagnetic metalloid include $NiMnSb$, $CrO_2$, $La_{1-x}Ca_xMnO_3$, $CoMnSb$, and $FeMnSb$. In addition to these materials, Heusler alloys having a C1b type crystalline structure and alloys including Mn can be employed in general.

Spin-polarized electrons are caused to be present within at least one of the substrate and the tip in order to allow tunneling current or field emission current with the spin-polarized electrons to flow between the substrate and the tip. At this time, when the spin orientation of conduction electrons is parallel to the magnetization orientation of molecules of the photoinductive ferromagnetic thin film (hereinafter, the term "parallel" means a state in which the magnetization orientation of molecules is the same as the spin orientation of conduction electrons), transition probability reaches the minimum, so that a relatively small current flows. When the spin orientation of conduction electrons is antiparallel with respect to the magnetization orientation of molecules of the photoinductive ferromagnetic thin film (hereinafter, the term "antiparallel" means a state in which the magnetization orientation of molecules is opposite to the spin orientation of conduction electrons), transition probability reaches the maximum, so that a relatively large current flows. Further, when the magnetization orientation of molecules of the photoinductive ferromagnetic thin film is disordered, the transition probability of the conduction electrons becomes average with respect to the magnetization orientation of molecules of the photoinductive ferromagnetic thin film, and compared with the antiparallel state, the transition probability becomes small, and a relatively small current flows. In accordance with the level of the current, the magnetized states of molecules of the photoinductive ferromagnetic thin film can be read as stored information. As described above, in the present invention, the state in which molecules of the photoinductive ferromagnetic thin film are magnetized in the same direction corresponds to "0" or "1" while the state in which molecules of the photoinductive ferromagnetic thin film are randomly magnetized corresponds to "1" or "0". Thus, writing and reading of information are enabled. Also the respective magnetic orientation of molecules can correspond to the written states "0" and "1".

In the case where electrons flow between the tip and the substrate in order to disorder or reverse the magnetization orientation of molecules of the photoinductive ferromagnetic thin film, the size of a unit memory area is determined by the diameter of an electron beam. Since use of the tip can make the diameter of the electron beam very small, the unit memory area of the photoinductive ferromagnetic thin film can be made as small as the length of the molecule.

Also, in the case where "0" or "1" is stored through radiation of a light beam onto a unit memory area that reverses the magnetization orientation of molecules to the first or second direction, the size of the unit memory area is determined by the diameter of the light beam.

BRIEF DESCRIPTION OF THE DRAWING

FIG. 3 is a diagram showing the structure of a memory device according to a second embodiment of the present invention;

DESCRIPTION OF THE PREFERRED EMBODIMENTS

Embodiments of the present invention will next be described with reference to the drawings.

Figure 1:
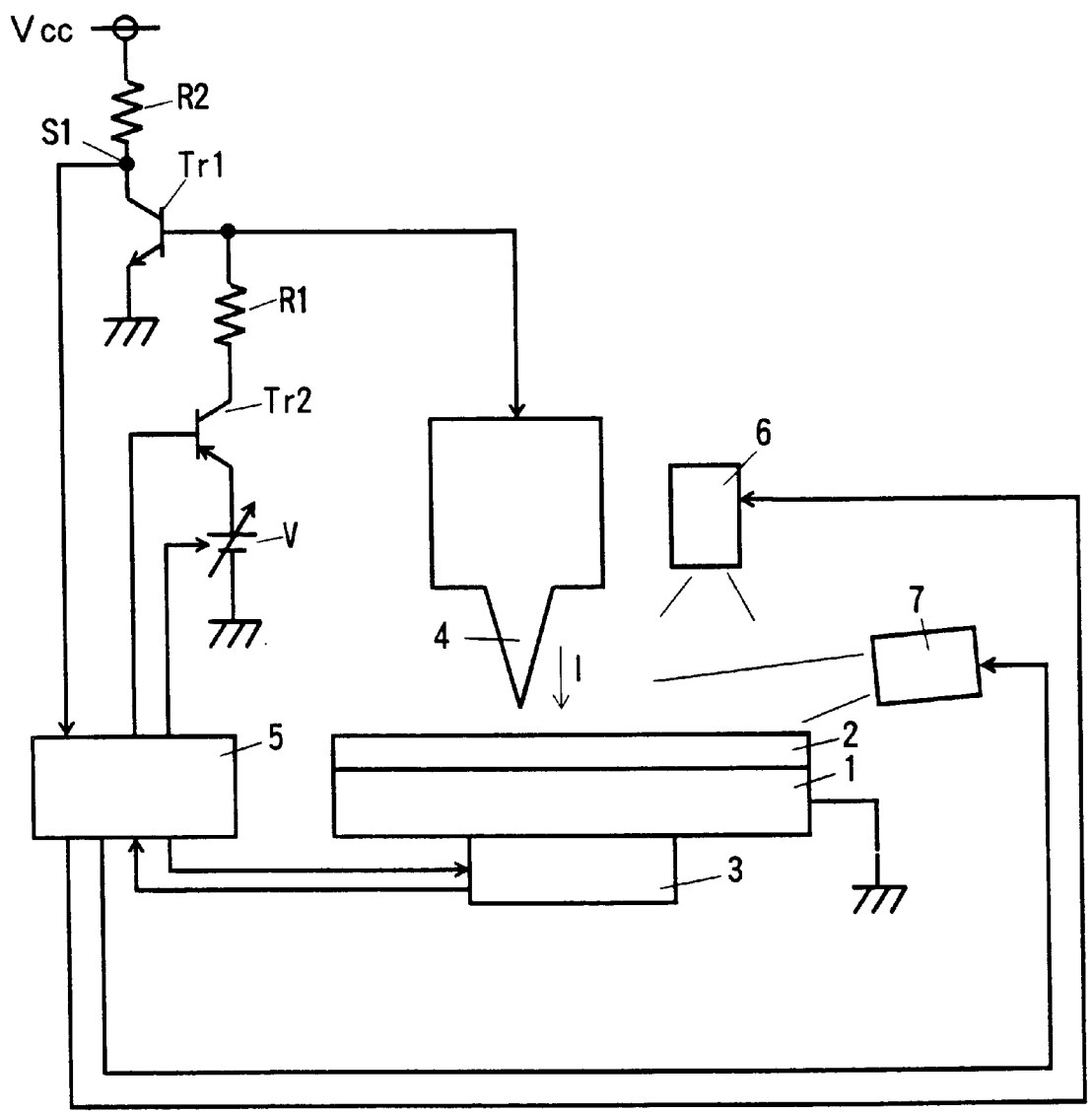
FIG. 1 is a diagram showing the structure of a memory device according to a first embodiment of the present invention.

FIG. 1 shows the structure of a memory device according to a first embodiment of the present invention. A photoinductive ferromagnetic thin film 2 is formed on a GaAs substrate 1 by use of an LB method. The photoinductive ferromagnetic thin film 2 is made from a cobalt-iron cyanide and has a thickness of 1 nm, which allows current to tunnel therethrough. A tip 4 formed of a nonmagnetic metal such as tungsten is arranged along the z-axis such that the tip 4 faces the photoinductive ferromagnetic thin film 2 with a vacuum gap disposed therebetween. The GaAs substrate 1 is disposed on an xyz scanner 3, which is driven by a piezoelectric device and serves as a position controller. The relative three-dimensional positional relationship between the GaAs substrate 1 and the tip 4 is changed by the xyz scanner 3. The tip 4 may be formed through electrolytic etching or formed from a thin film made through physical deposition such as spattering, vacuum deposition, or the like. Also, the tip 4 can be made very fine through focused-ion-beam machining or the like. The above-described structures are the same as those of the scanning tip and scanning mechanism of an STM or the like.

Writing means is constituted by a resistor R1, a transistor Tr2, and a variable DC power source 17. A voltage output from the variable DC power supply V is applied between the tip 4 and the substrate 1. A relatively large current flows between the tip 4 and the substrate 1 by applying a relatively high voltage therebetween, so that randomization of the magnetization orientation of molecules of the photoinductive ferromagnetic thin film 2; i.e., writing operation, is carried out. Also, application of a relatively low voltage enables tunneling current to flow between the tip 4 and the substrate 1. In order to detect the tunneling current, there is disposed a transistor Tr1, which turns on and off in accordance with the magnitude of the tunneling current and serves as reading means. A signal S1, which is output from the collector terminal of the transistor Tr1 and represents read data, is input to a CPU 5 serving as control means. The CPU 5 outputs instruction data to the xyz scanner 3 in order to finely move the substrate 1 in the x, y, and z directions. Thus, the three-dimensional position of the tip 4 relative to the substrate 1 can be changed. Further, light radiation units 6 and 7 are disposed above the photoinductive ferromagnetic thin film 2. The light radiation unit 6, which serves as erasing means, radiates blue light uniformly onto the photoinductive ferromagnetic thin film 2. The light radiation unit 7, which serves as reading means, radiates circular polarized light uniformly onto the GaAs substrate 1 through the photoinductive ferromagnetic thin film 2. The radiation of light from the light radiation units 6 and 7 is instructed by the CPU 5.

Next, the operation of the memory device will be described. The CPU 5 instructs the light radiation unit 6 to radiate blue light uniformly onto the photoinductive ferromagnetic thin film 2. In this state, when (a magnetic field is applied to the photoinductive ferromagnetic thin film 2 in a predetermined horizontal direction; e.g., in the positive direction of the x-axis, molecules of the photoinductive ferromagnetic thin film 2 are magnetized in the positive direction of the x-axis, so that information stored in the photoinductive ferromagnetic thin film 2 is erased. That is, "0" is written into each unit memory area (hereinafter referred to as an "address"). Subsequently, the voltage of the variable DC power source V is raised in order to increase the current flowing between the tip 4 and the substrate 1 to a relatively high level. The xyz scanner 3 is then controlled such that the tip 4 scans over the photoinductive ferromagnetic thin film 2 along the y-axis direction (as a horizontal scanning) and the x-axis direction (as a vertical scanning). Synchronously with this scanning movement, the transistor Tr2 is turn on or off at each address. That is, when "1" is to be written, the transistor Tr2 is turned on, and when "0" is to be written, the transistor Tr2 is turned off. Thus, "0" or "1" is recorded at each address of the photoinductive ferromagnetic thin film 2 in accordance with instructions from the CPU 5.

When the information written into the photoinductive ferromagnetic thin film 2 in the above-described manner is to be read, control is performed as follows. The power supply voltage V and the distance between the tip 4 and the substrate 1 are set such that tunneling current flows between the tip 4 and the substrate 1. Subsequently, the light radiation unit 7 is operated to radiate circular polarized infrared rays onto the GaAS substrate 1 in the positive direction of the x-axis in order to excite in the conduction band electrons with spin oriented to a certain direction corresponding to the rotational direction of the circular polarized light. For example, through radiation of the light with right circular polarization, only electrons with spin oriented to the propagation direction of the light; i.e., in the positive direction of the x-axis can be excited in the conduction band. Depending on the relationship between the spin-polarized electrons and the magnetization orientation of molecules of the photoinductive ferromagnetic thin film 2, the magnitude of the tunneling current that flows to the tip 4 through the photoinductive ferromagnetic thin film 2 varies. In accordance with the magnitude of the tunneling current, the transistor Tr1 is turned on and off to output a signal S1. The CPU 5 reads the signal Si to read information consisting of "0"s and "1"s stored in the respective addresses.

Next, the principle of operation of the memory device will be described.

a) Case in which the spin orientation of spin-polarized electrons of the GaAs substrate is parallel to the magnetization orientation of molecules of the photoinductive ferromagnetic thin film 2:

When right-circular poralized light is radiated onto the GaAs substrate 11 only electrons with spin oriented to the propagation direction of the light (i.e., the positive direction of the x-axis) can be excited in the conduction band. The excess spin oriented to the positive direction of the x-axis is defined as up spin.

Figure 2A:
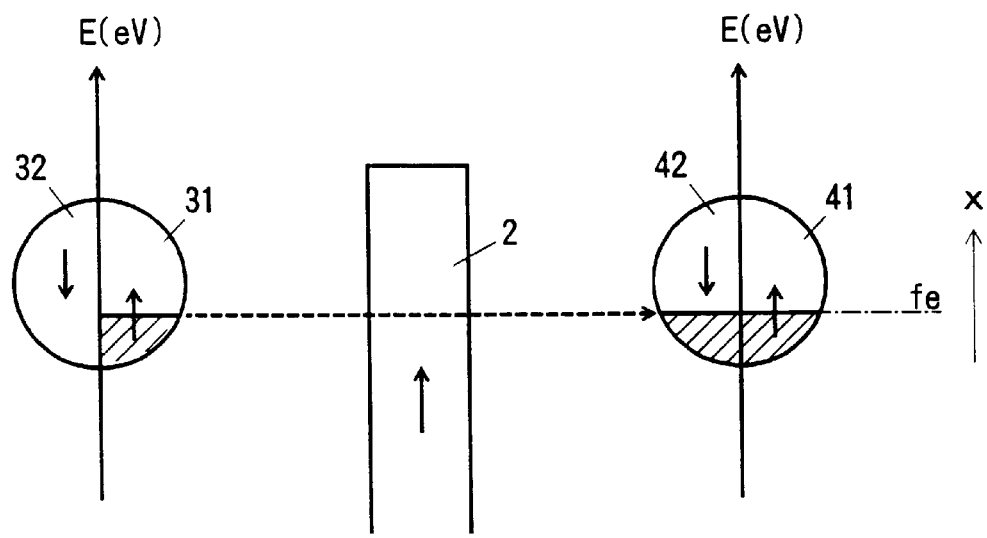
FIGS. 2A and 2B are energy state diagrams for explaining a tunnel effect in the memory device according to the first embodiment.

It is assumed that molecules at a certain address of the photoinductive ferromagnetic thin film 2 are magnetized in the positive direction of the x-axis. This state is defined as a parallel state. FIG. 2A shows state density of electrons, in which the vertical axis represents the energy level E of electrons, and the horizontal axis represents the state density D(E) of electrons at an electron energy level E. As is well known, the occupation probability of electrons in a certain state varies in accordance with Fermi-Dirac's distribution function F(E) with respect to the energy level E. Accordingly, the electron density N(E) at the energy level E is given by D(E)·F(E).

Also, as is well known, the energy level at which the occupation probability of electrons becomes ½ at an arbitrary temperature is defined as the Fermi level, or fe, and the conduction behavior of electrons within a substance is generally determined by the behavior of electrons existing within a very small width Δ with respect to the Fermi level fe.

The GaAs substrate 1 has two conduction bands; i.e., an up-spin conduction band 31 and a down-spin conduction band 32. As shown in FIG. 2A, the right-circular poralized light excites only up-spin electrons, so that optically excited electrons exist in the up-spin conduction band 31 only and do not exist in the down-spin conduction band 32. Meanwhile, since the tip 4 is made of a nonmagnetic metal, it has two conduction bands; i.e., an up-spin conduction band 41 and a down-spin conduction band 42. These conduction bands 41 and 42 are filled with electrons in accordance with the same distribution function.

The Fermi level fe exists in the bands 31, 32, 41 and 42 as shown in FIG. 2A. Since a voltage is applied between the tip 4 and the substrate 1 such that the tip 4 becomes positive while the substrate 1 becomes negative, electrons tunnel from the substrate 1 to the tip 4 through the photoinductive ferromagnetic thin film 2 and the vacuum gap. At this time, since the spin angular momentum of the electron is conserved and therefore the spin orientation is maintained, up-spin electrons excited in the GaAs substrate 1 transit from the conduction band 31 to the conduction band 41 of the tip 4 due to tunneling. At this time, if molecules of the photoinductive ferromagnetic thin film 2 are magnetized in the positive direction of the x-axis, the up-spin electrons excited in the GaAs substrate 1 have a high degree of exchange interaction with molecules whose magnetization orientation are parallel to the spin orientation of the electrons, so that the probability of transition to the conduction band 41 of the tip 4 becomes considerably low. Therefore, in the case shown in FIG. 2A in which the molecules of the photoinductive ferromagnetic thin film 2 are magnetized in the direction of the up-spin electrons, no tunneling current flows between the substrate 1 and the tip 4.

b) Case in which the magnetization orientation is antiparallel:

Next, a description will be given of the case where the spin orientation of electrons excited in the GaAs substrate 1 is antiparallel to the magnetization orientation of molecules of the photoinductive ferromagnetic thin film 2.

As in the above-described model shown in FIG. 2A, the tip 4 has a conduction band 41 for up-spin electrons in which the Fermi level fe exists. Therefore, the up-spin electrons optically excited in the GaAs substrate 1 can tunnel to the conduction band 41 for up-spin electrons of the tip 4. Since the spin orientation of the up-spin electrons in the GaAs substrate 1 is antiparallel to the magnetization orientation of molecules of the photoinductive ferromagnetic thin film 2, the exchange interaction is considerably small, so that scattering and trapping by the molecules do not occur. Consequently, the probability of transition from the conduction band 31 of the GaAs substrate 1 to the conduction band 41 of the tip 4 is large and therefore a large tunneling current flows.

c) Case in which the magnetization orientation is random:

When the direction of magnetic moment of molecules of the photoinductive ferromagnetic thin film 2 is random, the exchange interaction between the spin and the magnetic moment of the molecules assumes an intermediate value between the value for the parallel state and the value for the antiparallel state, so that there flows a tunneling current that is larger than that in the parallel state and smaller than that in the antiparallel state.

In order to distinguish the above-described cases b) and c), the circuit is designed such that the transistor Tr1 turns on and off in accordance with the magnitude of the tunneling current in order to output an on-off signal S1. The CPU 5 reads the on-off signal S1 in order to read out information.

Figure 2B:
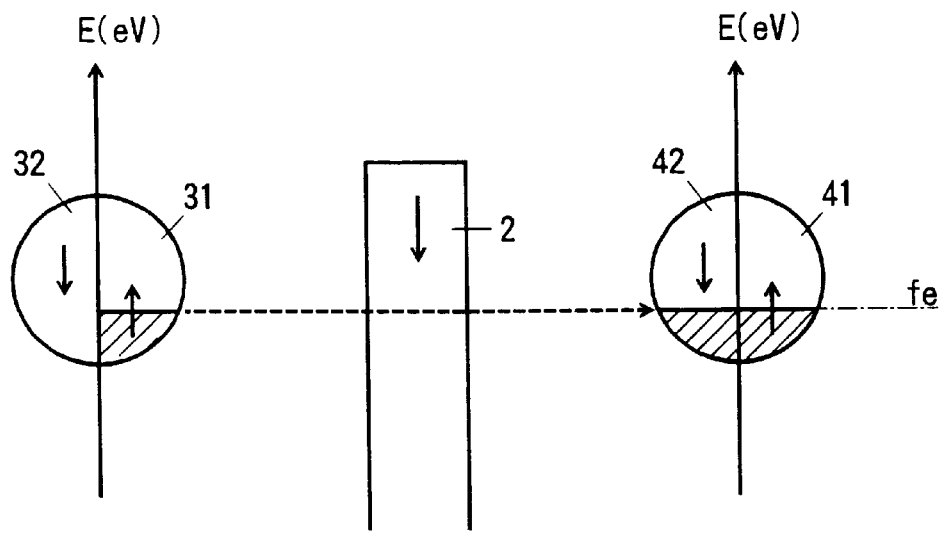

The polarity of the voltage applied between the GaAs substrate 1 and the tip 4 may be opposite to that in the above-described embodiment. In this case, electrons tunnel from the tip 4 to the GaAs substrate 1 in the model shown in FIGS. 2A and 2B.

The above-described embodiment may be modified such that the substrate 1 is formed of a nonmagnetic metal, and the tip 4 is formed of GaAs, and circular polarized light is radiated onto the tip 4 in order to generate spin-polarized electrons. The conduction model for this case is obtained by replacing the substrate shown in FIGS. 2A and 2B with a tip and replacing the tip shown in FIGS. 2A and 2B with a substrate. Of course, the polarity of the applied voltage may be reversed.

Figure 4A:
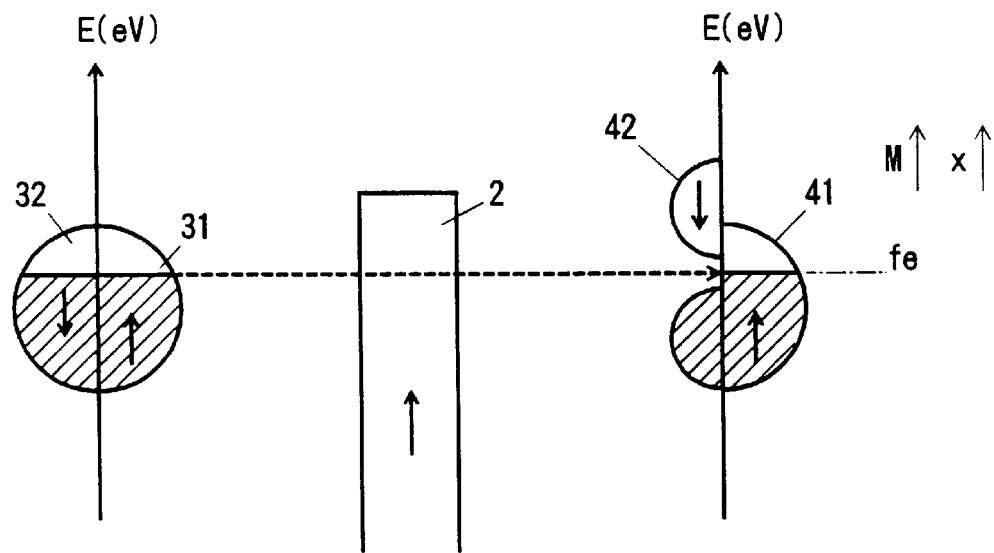
FIGS. 4A and 4B are energy state diagrams for explaining a tunnel effect in the memory device according to the second embodiment.
Figure 4B:
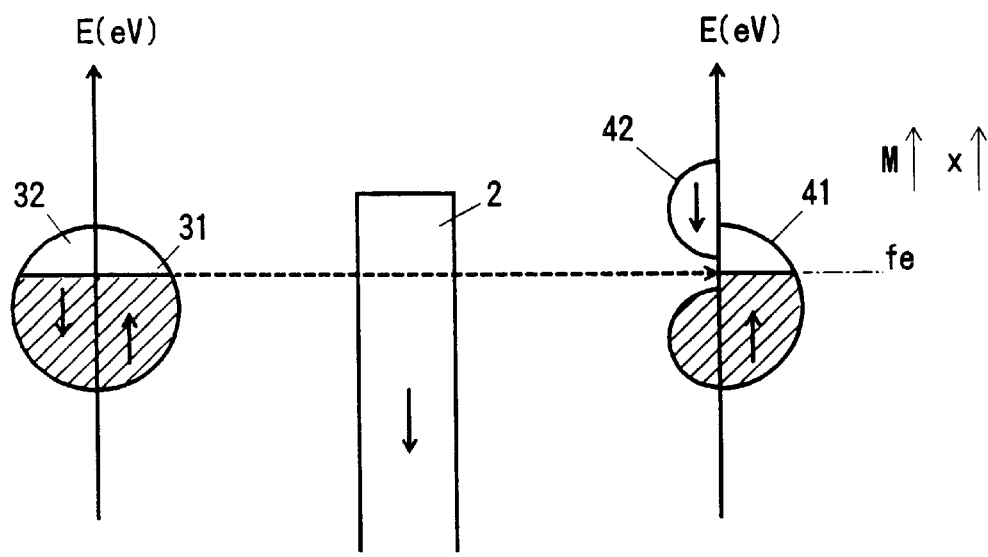

Next, a description will be given of a second embodiment shown in FIG. 3, in which a substrate 11 is formed of a nonmagnetic metal such as copper while a tip 14 is formed of NiMnSb, which is a magnetic metalloid. In this embodiment, the light radiation unit 7 shown in FIG. 1 is unnecessary, and the means for changing the positional relationship between the substrate 11 and the tip 14 is the same as that shown in FIG. 1. The tunnel conduction model for this case is shown in FIG. 4. Since the substrate 11 is formed of a nonmagnetic metal, the up-spin conduction band 31 and the down-spin conduction band 32 are equally filled with electrons. However, when the tip 14 is magnetized in the positive direction of the x-axis, the conduction band of the tip 14 splits into two conduction bands 41 and 42, because the spin-polarization coefficient of the magnetic metalloid is 1. In this case, the conduction band 42 in which down-spin electrons can be conducted exists at an energy level sufficiently higher than the Fermi level fe. That is, only up-spin electrons at the Fermi level fe exist within the conduction band 41, and no down-spin electrons exist within the conduction band 42 therefor.

The up-spin electrons existing at the Fermi level fe of the substrate 11 can tunnel to the conduction band 41 of the tip 14. However, the down-spin electrons existing at the Fermi level fe of the substrate 11 cannot tunnel to the tip 14 because the tip 14 does not have an energy level at which the down-spin electrons can tunnel. Therefore, in the case where the tip 14 is formed of a magnetic metalloid, only up-spin electrons contribute to tunneling. When molecules of the photoinductive ferromagnetic thin film 2 are magnetized in the positive direction of the x-axis, no tunneling current flows due to the tunneling action in the parallel state described above in section a). When molecules of the photoinductive ferromagnetic thin film 2 are magnetized in the negative direction of the x-axis, a large tunneling current flows due to the tunneling action in the antiparallel state described above in section b). When molecules of the photoinductive ferromagnetic thin film 2 are magnetized randomly, the tunneling action in the random state described above in section c) occurs, so that the tunneling current is determined in accordance with the average value of transition probabilities, and therefore the tunneling current takes an intermediate value.

The above-described embodiments may be modified such that the substrate 1, 11 is formed of a nonmagnetic metal; an electrode made of a magnetic metalloid is provided on the substrate 1, 11; and only up-spin electrons are injected into the substrate 1, 11 from the electrode. Similarly, the above-described embodiments may be modified such that the tip 4, 14 is formed of a nonmagnetic metal; an injection electrode made of a magnetic metalloid is provided on the tip 4, 14; and only up-spin electrons are injected into the tip 4, 14.

In the above-described embodiments, a description is given of reading out of information through use of tunneling current. However, the above-described structure may be modified such that a grid for electron radiation is provided between the tip 4, 14 and the substrate 1, 11; a high voltage is applied to the grid in order to radiate electrons from the tip 4, 14; and the thus-radiated electrons are used for reading out information. In this case as well, the magnitude of the current flowing between the substrate 1, 11 and the tip 4, 14 is determined in accordance with the relationship between the magnetization orientation of molecules of the photoinductive ferromagnetic thin film 2 and the spin orientation of electrons.

Figure 5:
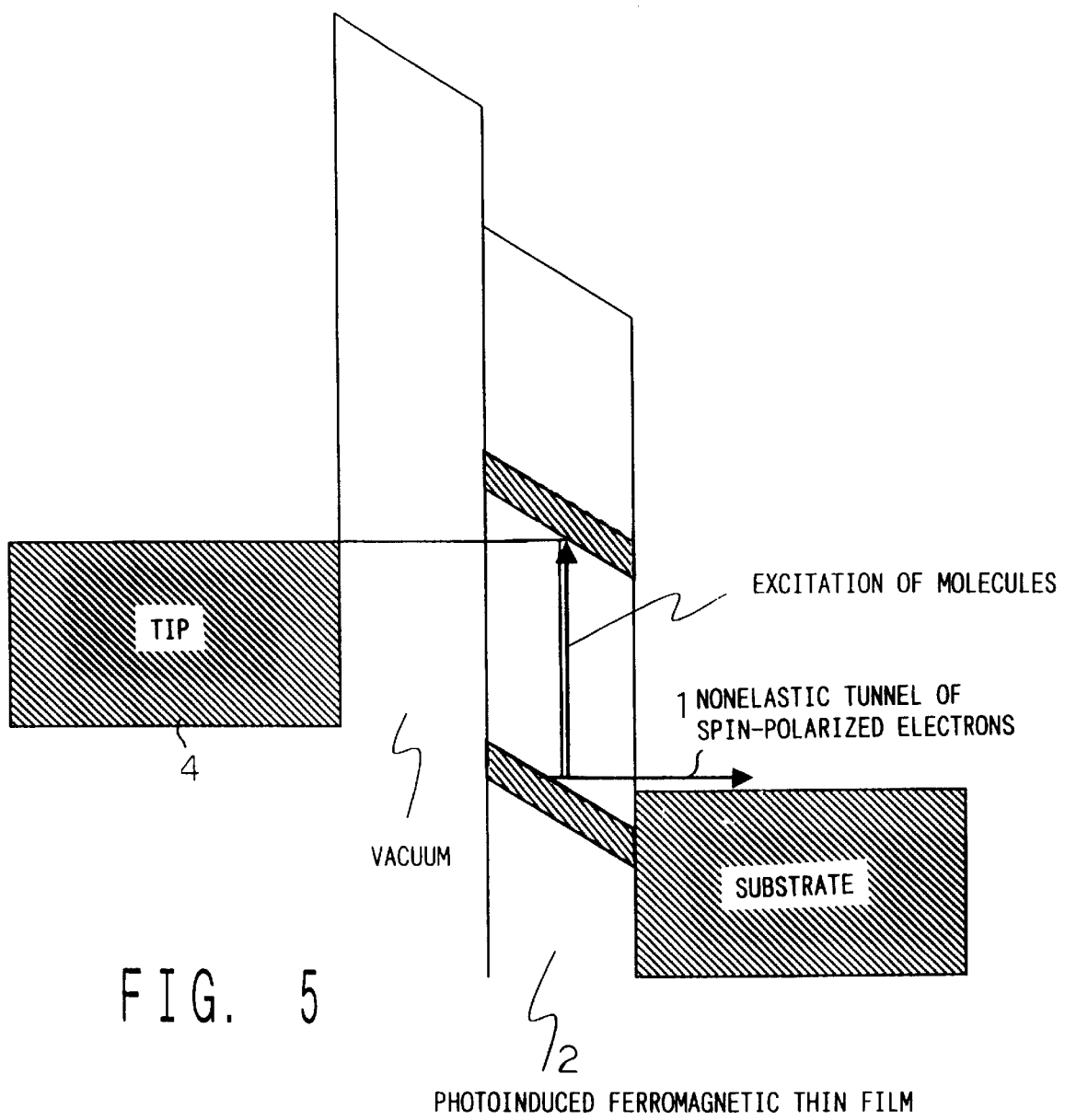
FIGS. 5 and 6 are explanatory diagrams showing a memory device according to a third embodiment of the present invention, in which spin-polarized electrons are radiated onto a photoinductive ferromagnetic material in order to control the magnetization orientation of a photoinductive ferromagnetic thin film.

A memory device according to a third embodiment of the present invention will be described with reference to FIGS. 5 and 6.

In this embodiment, when stored contents are to be initialized, blue light is radiated onto a photoinductive ferromagnetic thin film 2 while a magnetic field is applied thereto in a desired direction, in order to magnetize all the molecules of the photoinductive ferromagnetic thin film 2 in one direction. In order to write data, electrons having a spin oriented opposite to the above-described magnetization orientation are radiated onto the photoinductive ferromagnetic thin film 2 in order to form a region in which molecules are magnetized in the opposite direction with respect to the initial direction. The radiation of electrons is performed by applying a negative voltage to the tip 4 for radiating spin-polarized electrons onto the photoinductive ferromagnetic thin film 2. At this time, the bias voltage of the tip 4 is adjusted such that the energy level of electrons injected into the photoinductive ferromagnetic thin film 2 becomes larger than that of the ground state by the energy of blue light; i.e., about 3 eV, as shown in FIG. 5. If the current density increases and thus the photoinductive ferromagnetic thin film 2 is heated, the photoinductive ferromagnetic thin film 2 becomes paramagnetic. Therefore, the distance between the tip 4 and the surface of the thin film 2 is adjusted such that the current is maintained at an appropriately small level.

Figure 6:
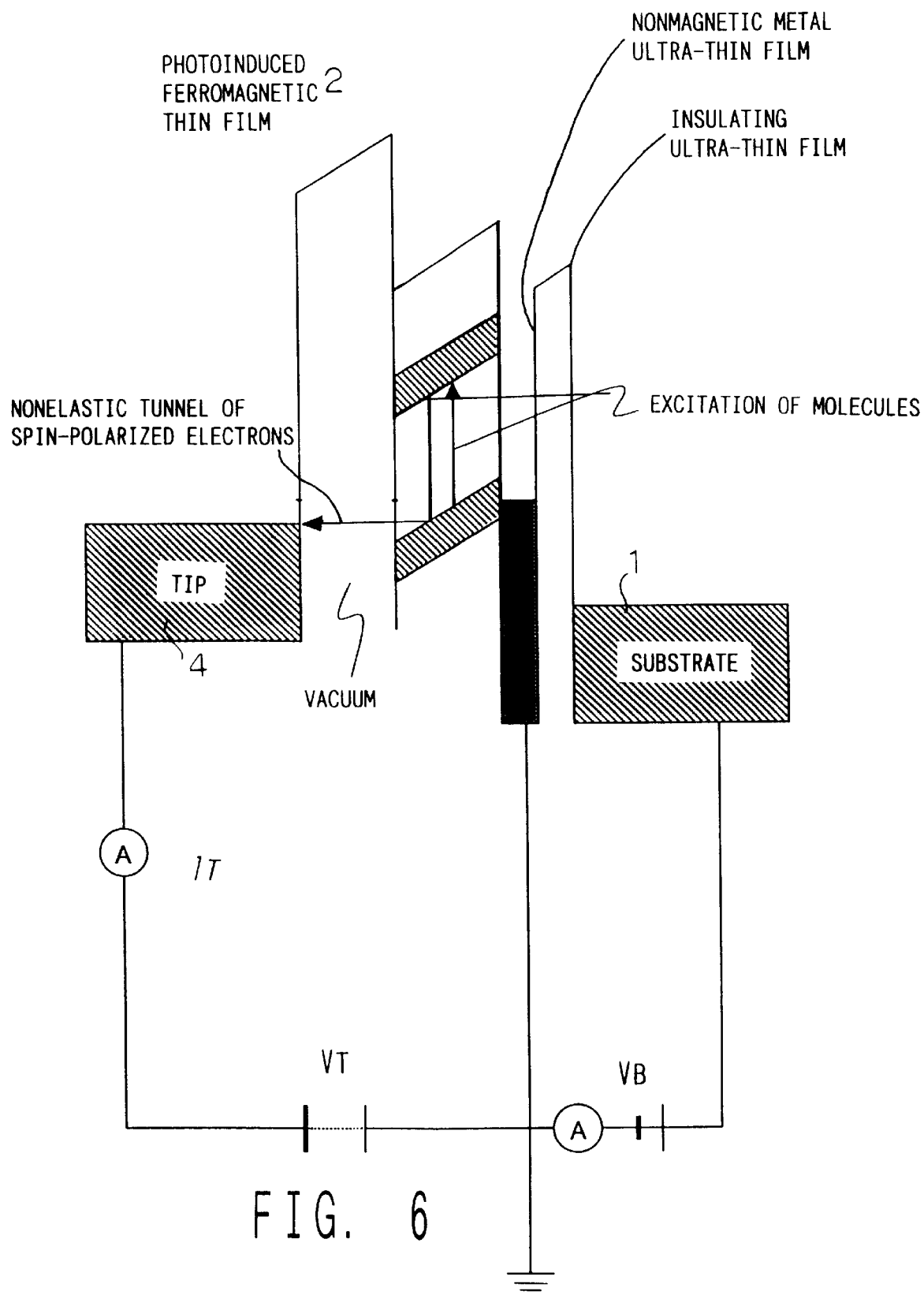

Also, through formation of a circuit shown in FIG. 6, spin-polarized electrons having an appropriate energy level are injected from the substrate 1 to the photoinductive ferromagnetic thin film 2 in order to control the magnetization of molecules of the photoinductive ferromagnetic thin film 2, thereby writing data therein. The energy level of electrons can be changed by $V_B$. Of course, this method can also be applied to the case where spin-polarized electrons are injected from the tip 4.

What is claimed is:

1. A memory device comprising:

a substrate;

a photoinductive ferromagnetic thin film formed on said substrate and including molecules capable of being magnetically oriented; and a tip opposed to said photoinductive ferromagnetic thin film; a relative positional relationship between said tip and said photoinductive ferromagnetic thin film being changeable; and wherein at least one of said substrate and said tip is formed of a material in which spin-polarized electrons exist, so that the magnetization orientation of the molecules can be detected as recorded information, based on tunneling current or field emission current of spin-polarized electrons that flow between said tip and said substrate.

2. A memory device according to claim 1, wherein said photoinductive ferromagnetic thin film is formed of at least one transition metal cyanide.

3. A memory device according to claim 2, wherein said transition metal cyanide is at least one of cobalt-iron cyanide $(K_{0.2}Co_{1.4}[Fe(CN)_6].6.9H_2O)$ and nickel-iron cyanide.

4. A memory device according to claim 1, wherein a state in which the magnetization orientation of molecules in a unit memory area is ordered in a predetermined direction and a state in which the magnetization orientation of molecules in the unit memory area is disordered correspond to "0" and "1" representing information.

5. A memory device according to claim 4, wherein the state in which the magnetization orientation of molecules in a unit memory area is ordered in a predetermined direction is a state created by applying a magnetic field in the predetermined direction and radiating light.

6. A memory device according to claim 4, wherein the state in which the magnetization orientation of molecules in a unit memory area is disordered is a state created by heat which is generated by current flow in said photoinductive ferromagnetic thin film or by heating said photoinductive ferromagnetic thin film.

7. A memory device according to claim 1, wherein a state in which the magnetization orientation of molecules in a unit memory area is ordered in a predetermined direction and a state in which the magnetization orientation of the molecules in the unit memory area is ordered in the direction opposite to the predetermined direction correspond to "0" and "1" representing information.

8. A memory device according to claim 7, wherein the state in which the magnetization orientation of molecules in a unit memory area is ordered in a predetermined direction is a state created by applying a magnetic field in the predetermined direction and by radiating light, and the state in which the magnetization direction of molecules in the unit memory area is ordered in the direction opposite to the predetermined direction is a state created by applying a magnetic field in the opposite direction and by radiating light.

9. A memory device according to claim 7, wherein the state in which the magnetization orientation of molecules in a unit memory area is ordered in a predetermined direction is a state created by applying a magnetic field in the predetermined direction and by radiating light, and the state in which the magnetization orientation of molecules in the unit memory area is ordered in the direction opposite to the predetermined direction is a state created by radiating electrons having a spin oppositely oriented to the predetermined direction.

10. A memory device according to claim 1, further comprising a piezoelectric xyz scanner for changing the relative position between said tip and said photoinductive ferromagnetic thin film.

11. A memory device according to claim 1, wherein at least one of said substrate and said tip is formed of a semiconductor, which has a large spin-orbit interaction and a relatively narrow forbidden band and in which spin-polarized electrons with spins oriented to the direction corresponding to a rotational direction of a circular polarized light are excited into a conduction band in response to the radiation of circular polarized light.

12. A memory device according to claim 11, wherein said semiconductor is GaAs.

13. A memory device according to claim 1, wherein at least one of said substrate and said tip is formed of a material selected from the group consisting of ferromagnetic materials and ferromagnetic metalloids.

14. A memory device according to claim 13, wherein said ferromagnetic metalloids are NiMnSb, $CrO_2$, $La_{1-x}Ca_xMnO_3$, ba CoMnSb, and FeMnSb.

15. A memory device according to claim 1, wherein at least one of said substrate and said tip is formed of a material in which spin-polarized electrons can be generated through light excitation, magnetic field excitation, or current injection.

* * * * *